United States Patent [19]
Papin

[11] 3,773,363
[45] Nov. 20, 1973

[54] CONTROL VALVE AND SYSTEM
[75] Inventor: Joseph E. Papin, Florissant, Mo.
[73] Assignee: Wagner Electric Corporation, Newark, N.J.
[22] Filed: Mar. 10, 1972
[21] Appl. No.: 233,665

[52] U.S. Cl. ................................................ 303/6 C
[51] Int. Cl. ............................................ B60t 13/10
[58] Field of Search ................. 200/82 D; 303/84 A, 303/6 C; 188/345, 151 A

[56] References Cited
UNITED STATES PATENTS
3,441,318 4/1969 Bueler ................................. 303/6 C
3,669,505 6/1972 Falk ..................................... 303/6 C Primary Examiner—Richard A. Schacher
Attorney—Joseph E. Papin

[57] ABSTRACT

A dual fluid pressure brake system is provided with a proportioning valve responsive to the separate fluid pressures of both said systems for performing a proportioning operation on the fluid pressure in one of said systems, and said proportioning valve is also responsive to the fluid pressure in said one system of a lesser predetermined value to perform its proportioning operation thereon at a lesser proportioning ratio upon the failure of the other of said systems. A comparator piston is responsive to fluid pressure differentials in excess of a predetermined value between the dual systems for actuating a warning signal.

38 Claims, 7 Drawing Figures

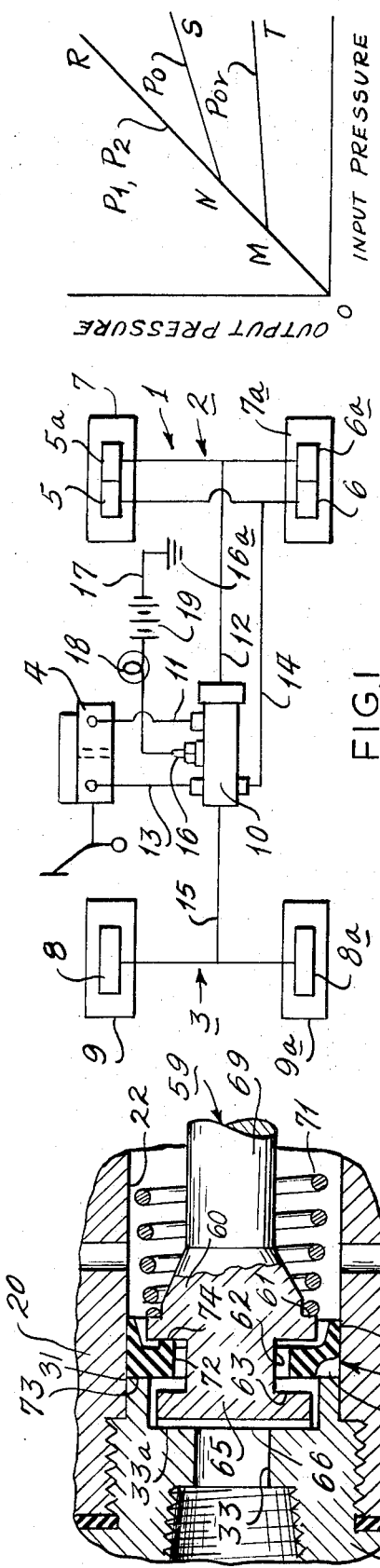
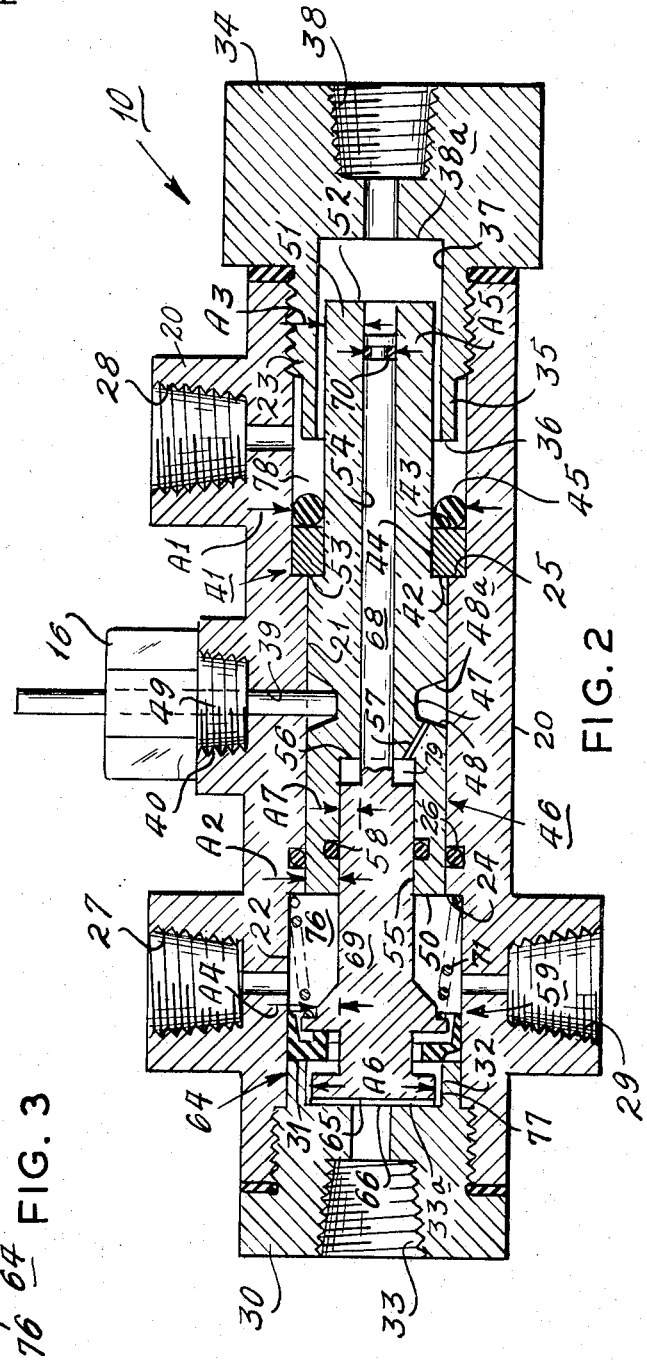

CONTROL VALVE AND SYSTEM

FIELD OF THE INVENTION

This invention relates in general to split or dual brake systems for a vehicle and in particular to a control valve for proportioning the fluid pressure in one of said systems under preselected conditions.

BACKGROUND OF THE INVENTION

In the past, horizontally split brake systems were utilized on vehicles wherein each of the brakes of the front axle was provided with separate or dual wheel cylinders or motors for braking purposes while each of the brakes of the rear axle set was provided with a single wheel cylinder or motor for braking purposes, and one of the dual wheel cylinders of the front axle set of brakes was connected with the wheel cylinders of the rear axle sets of brakes in one of the system branches and with one fluid pressure generating chamber of a dual or split master cylinder while the other of the dual wheel cylinders of the front axle set of brakes was connected in the other of the system branches with the other fluid pressure generating chamber of said dual or split master cylinder. One of the disadvantageous features of such past horizontally split braking systems was that upon the failure the other of said system branches connected only with the wheel cylinders of the front axle set of brakes, the brake system became unbalanced with the resulting affect of the rear axle set of brakes tending to skid out or lock up prior to the front axle set of brakes.

The principle object of the present invention is to provide a horizontally split brake system and a control valve therefor which overcomes the aforementioned disadvantageous or undesirable feature of such past brake systems, and this, as well as other objects and advantageous features of the present invention will become apparent in the specification which follows.

SUMMARY OF THE INVENTION

Briefly, the present invention includes a split fluid pressure system having modulating means responsive to the fluid pressure of each system for performing fluid pressure modulating operations in one of said dual systems, and said modulating means performing its modulating operation in said one of said dual systems at a lesser fluid pressure and modulating ratio upon the failure of the other of said dual systems. The present invention also includes means for comparing the separate fluid pressures in the system and those subjected to the modulating means for actuating a warning signal in the event of the failure of one of said separate fluid pressures.

BRIEF DESCRIPTION OF THE DRAWINGS

In the drawings which illustrate embodiments of the invention and wherein like numerals refer to like parts wherever they occur:

FIG. 1 is a schematic view of a horizontally split brake system embodied in the present invention;

FIG. 2 is a sectional view illustrating the control valve of FIG. 1 also embodied in the present invention in cross-section;

FIG. 3 is an enlarged fragmentary sectional view taken from the control valve of FIG. 2;

FIG. 4 is a graphical representation illustrating the applied or output fluid pressure effected by the control valve of FIG. 2 in response to the supplied or input fluid pressure;

DESCRIPTION OF THE PREFERRED EMBODIMENT

Figure 5:
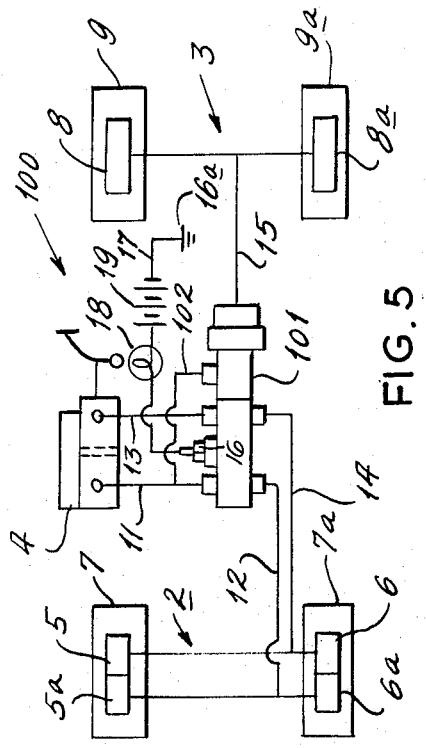
FIG. 5 is a schematic view of another horizontally split brake system also embodied in the present invention.
Figure 7:
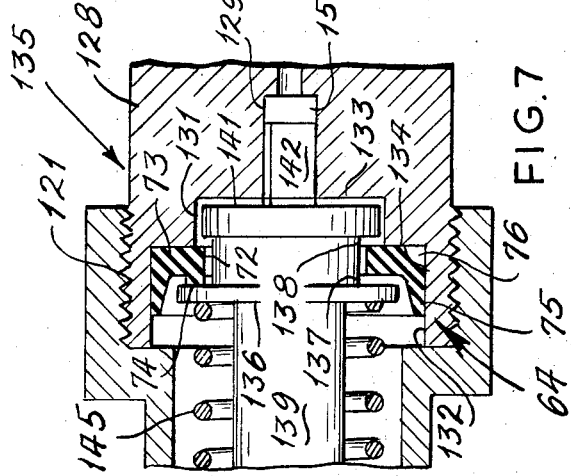
FIG. 7 is an enlarged fragmentary sectional view taken from the control valve of FIG. 6.

Referring now to the drawings in detail and in particular to FIG. 1, a fluid pressure system, such as the horizontally split brake system illustrated generally at 1 adapted for use on a vehicle, is provided with separate branches or circuits 2, 3 connected between the separate primary and secondary or pair of fluid pressure generating chambers (not shown) of a tandem, dual or split master cylinder 4 and between fluid pressure responsive motors or dual or split wheel cylinders 5, 5a and 6, 6a of a pair or front axle set of friction devices or brakes 7, 7a and fluid pressure responsive motors or wheel cylinders 8, 8a of a pair or rear axle set of friction devices or brakes 9, 9a respectively, and a control valve 10 is interposed in said branches. In the system branch 2, a conduit 11 is connected between one fluid pressure generating chamber of the split master cylinder 4 and an inlet port of the control valve 10, and another conduit 12 has one end connected with an outlet port of said control valve while the other end thereof branches to connect with the split wheel cylinders 5a, 6a of the front brakes 7, 7a; however, it is obvious that the conduit 12 could alternatively be connected with the conduit 11 without said control valve instead of being connected with the outlet port thereof, if desired. In the branch 3, a conduit 13 is connected between the other fluid pressure generating chamber of the split master cylinder 4 and another inlet port of the control valve 10, and another conduit 14 has one end connected with another outlet port of said control valve while the other end thereof branches to connect with the split wheel cylinders 5, 6 of the front brakes 7, 7a; however, it is obvious that the conduit 14 could alternatively be connected with the conduit 13 without said control valve instead of being connected with the outlet port thereof, if desired. Another conduit 15 is provided in the branch 3 having one end connected with another outlet port of the control valve 10 while the other end thereof branches to connect with the wheel cylinders 8, 8a of the rear brakes 9, 9a, respectively, and to complete the description of the system 1, an electric switch or mechanism 16 of the circuit making or breaking type well known in the art is provided in said control valve being connected to ground at 16a by an electrical lead 17 having a driver warning device or lamp 18 and a battery 19 serially connected therein.

Referring now to FIG. 2, the control valve 10 is provided with a housing 20 having a bore 21 therein interposed between opposed counterbores 22, 23, and opposed annular shoulders 24, 25 are provided on said housing between said bore and counterbores, respectively, said bore having a peripheral seal 26 disposed therein adjacent to the shoulder 24. A pair of inlet ports 27, 28 which receive conduits 13, 11, as previously mentioned, are provided in the housing 20 intersecting with the counterbores 22, 23 adjacent to the mid-portions thereof, repectively, and an outlet port 29 which receives the conduit 14, as previously mentioned, is also provided in said housing intersecting with the counterbore 22 adjacent to the mid-portion thereof. A closure member or end plug 30 is threadedly received in the leftward or open end of the counterbore 22 having an interior or abutment end 31 intersected by an axial bore 32 which connects with another outlet port 33 having an annular shoulder 33a therebetween, said outlet port 33 receiving the conduit 15, as previously mentioned. Another closure member or end plug 34 is threadedly received in the rightward or open end of the counterbore 23 having an extension 35 thereon which protrudes coaxially into said counterbore terminating at the interior or free end 36 thereof axially inwardly or past the intersection of the inlet 28 with said counterbore, and an axial bore 37 and outlet port 38 having an annular shoulder 38a therebetween are provided in said closure member, said bore intersecting with said extension free end and said outlet port receiving the conduit 12, as previously mentioned. A cross-bore 39 is also provided in the housing 20 having one end intersecting with the housing bore 21 adjacent to its mid-portion while the other end thereof connects with a threaded cross-counterbore 40 in which the electrical switch 16 is threadedly received, as previously mentioned.

A centering or return member, such as the annular piston indicated generally at 41, is slidably received in the housing counterbore 23 having opposed ends or abutment surfaces 42, 43, and an axially extending bore 44 is provided through said centering piston intersecting with said opposed ends thereof. A sealing member, such as the O-ring 45, is sealably engaged between the housing counterbore 23 and the centering piston rightward end 43, and the centering piston leftward end 42 is normally engaged with the housing shoulder 25, said sealing member and centering piston rightward end defining an annular effective area $A_1$ subjected to the fluid pressure at the inlet port 28 at all times.

Comparator means, such as the reciprocal switch actuating member or piston indicated generally at 46, is slidably received in the housing bore 21, and annular or peripheral groove means 47 is provided in the comparator piston 46 defining opposed driving or camming surfaces or sidewalls 48, 48a generally located immediately below the housing cross-bore 39 for driving engagement with a switch operating member 49 of the electrical switch 16 upon the translatory or reciprocating movement of the comparator piston 46 from its centered or normal operating position, as shown. The comparator piston 46 extends coaxially through the sealing member 26 in the housing bore 21 in sealing engagement therewith, and a leftward free end or end portion 50 is provided on said comparator piston terminating generally at or adjacent to the housing shoulder 24. A rightwardly extending reduced portion or extension means 51 is integrally provided on the comparator piston 46, and said extension means is slidably received in the centering piston bore 44 extending coaxially through the sealing member 45 in sealing engagement therewith into the closure member bore 37. A rightward abutment or free end portion 52 is provided on the extension 51, and an annular shoulder or abutment 53 is provided on the comparator piston 46 substantially at the juncture thereof with the extension 51 for driving or centering engagement with the centering piston leftward end 42. An axial bore and counterbore 54, 55 having an annular shoulder or abutment 56 therebetween is provided in the comparator piston 46 intersecting with the free ends 50, 52 thereof, and a venting passage 57 is provided in said comparator piston connected between said shoulder and the camming surface 48, said counterbore having a peripheral sealing member or O-ring seal 58 disposed therein.

Referring now to FIGS. 2 and 3, modulating, metering or proportioning means, such as the piston member indicated generally at 59, is provided with an annular head or metering portion 60 in the housing counterbore 22 having an annular shoulder or retainer portion 61 thereon, and peripheral groove means 62 is provided in said head portion defining an annular metering shoulder 63 for metering engagement with a cooperating seating or metering means, such as the annular sealing or cup member indicated generally at 64 and discussed hereinafter. The proportioning piston 59 is also integrally provided with a reduced portion or extension means 65 on the leftward end thereof extending coaxially into the closure member bore 32, and an abutment or free end portion 66 is provided on said extension means for abutting engagement with the closure member shoulder 33a to define the inoperative, static or at-rest position of said proportioning piston. A pair or reduced portions or stepped extension means 68, 69 is integrally formed with the head portion 60 on the proportioning piston 59 and are respectively slidably received in the bore and counterbore 54, 55 of the comparator piston 46, and a peripheral sealing member or O-ring 70 is carried on the smaller of the stepped extensions 68 in sealing engagement with said comparator piston bore, the larger of said stepped extensions 69 extending coaxially through the comparator piston seal 58 in sealing engagement therewith. A metering or proportioning spring 71 is pre-compressed in abutting engagement between the housing shoulder 24 and the shoulder 61 of the proportioning piston 59 normally urging the leftward end 66 thereof toward abutting engagement with the closure member shoulder 33a.

The seating member 64 is provided with a centrally located aperture 72 extending axially therethrough and radially spaced from the groove 62 of the proportioning piston 59 between opposed side portions 73, 74 of said seating member. The seating member side 73 is normally seated in abutting engagement with the interior end 31 of the closure member 30 and also defines a valve seat about the seating member aperture 72 for metering engagement with the groove sidewall or valve member 63 of the proportioning piston 59. The seating member 64 is also provided with a peripheral lip 75 in sealing engagement with the housing counterbore 22, and a plurality of axially extending return flow passages 76 are provided between the seating member side 73 and lip 75, said return flow passages being normally closed by the sealing engagement of said lip with said housing counterbore.

An inlet chamber 76 is provided in the housing counterbore 22 generally between the sealing engagement of the proportioning piston groove side 63 with the sealing member valve seat 73, as discussed hereinafter, and the housing shoulder 24 and comparator piston end 50, and said inlet chamber is connected in pressure fluid communication with the inlet port 27 at all times.

An outlet chamber 77 is provided in the closure member bore 37 between the sealing engagement of the seating member valve seat 73 and the proportioning piston valve member 63, as discussed hereinafter, and the closure member shoulder 33a, and said outlet chamber is connected in pressure fluid communication with the outlet port 33 at all times. Another inlet chamber 78 is provided in the housing counterbore 23 between the centering piston O-ring 45 and the closure member 34, and said inlet chamber 78 is connected in pressure fluid communication with the inlet port 28 at all times. An atmospheric chamber 79 is provided in the counterbore 55 of the comparator piston 46 between the larger stepped extension 69 of the proportioning piston 59 and the comparator piston shoulder 56, and said atmospheric chamber is connected to atmosphere at all times through the comparator piston venting passage 57 and groove means 47, the housing cross-bore 39, and the threaded engagement of the electrical switch 16 with the housing cross-bore 40.

It should be noted that the comparator piston 46 is provided with an annular, cross-sectional effective area $A_2$ on the leftward end 50 thereof defined between the sealing engagement of said comparator piston with the seal 26 in the housing bore 21 and the sealing engagement of the larger stepped extension 69 of the proportioning piston 59 with the seal 58 in the comparator piston counterbore 55, and the area $A_2$ is subjected to the fluid pressure in the inlet chamber 76 at all times. The comparator piston 46 is also provided with another annular, cross-sectional effective area $A_3$ on the rightward end 52 thereof defined between the sealing engagement of the comparator piston extension 51 with the centering piston O-ring 45 and the sealing engagement of the seal 70 on the proportioning piston smaller stepped extension 68 with the comparator piston bore 54, and the area $A_3$ is subjected to the fluid pressure in the inlet chamber 78 at all times. The area $A_3$ is opposed to and predeterminately less than the area $A_2$ while also being additive to the area $A_1$ of the centering piston 41, and the sum of the additive areas $A_1$, $A_3$ is predeterminately greater than the opposing area $A_2$. The proportioning piston 59 is provided with an annular, cross-sectional, effective input area $A_4$ defined between the sealing engagement of the proportioning piston valve member 73 with the seating member seat 63 and the sealing engagement of the proportioning piston larger stepped extension 69 with the seal 58 in the comparator piston counterbore 55, and the area $A_4$ is subjected to the fluid pressure in the inlet chamber 77 at all times. Another cross-sectional effective input area $A_5$ which is additive to the area $A_4$ is also provided on the proportioning piston 59 being defined by the sealing engagement of the seal 70 on the proportioning piston smaller stepped extension 68 with the comparator piston bore 54, and the area $A_5$ is subjected to the fluid pressure in the inlet chamber 78 at all times. It is preferred that the area $A_4$ be less than the area $A_5$, as discussed hereinafter. A cross-sectional effective output area $A_6$ which is opposed to and greater than the input areas $A_4$, $A_5$ is provided on the proportioning piston 59 being substantially defined by the sealing engagement of the proportioning piston valve member 73 with the seating member valve seat 63 and subjected to the fluid pressure in the outlet chamber 77 at all times, and the output area $A_6$ is predeterminately greater than the sum of the opposed input areas $A_4$, $A_5$. To complete the description of the control valve 10, another annular, cross-sectional area $A_7$ is provided on the proportioning piston 59 being defined between the sealing engagement of the proportioning piston larger stepped extension 69 and the comparator piston seal 58 and the sealing engagement of the proportioning piston seal 70 with the comparator piston bore 54, and the area $A_7$ is substantially equal to the difference between area $A_6$ and the sum of the areas $A_4$, $A_5$, said area $A_7$ being subjected to atmosphere at all times through the venting passage 57 in the comparator piston 46.

OPERATION

Assuming the component parts of the system 1 and control valve 10 to be in their normal operating positions as shown in the drawings, manual operation of the split system master cylinder 4 creates input or supplied fluid pressures $P_1$, $P_2$ having substantially the same magnitudes in the primary and secondary fluid pressure generating chambers thereof (not shown), as well known in the art, and the supplied fluid pressure $P_1$ is transmitted through the conduit 13 and the inlet port and chamber 27, 76 of the control valve 10 to establish an output or applied fluid pressure Po at the outlet chamber and port 77, 33 which is transmitted therefrom through the conduit 15 and to the wheel cylinders 8, 8a to effect the respective energization of the rear axle brakes 9, 9a. The supplied fluid pressure $P_1$ also flows from the inlet chamber 76 through the outlet port 29 of the control valve 10 and the conduit 14 to the split wheel cylinders 5, 6 to effect the respective energization of the front axle brakes 7, 7a substantially simultaneously with the energization of the rear brakes 9, 9a. At the same time, the supplied fluid pressure $P_2$ flows through the conduit 11, the inlet port 28, the inlet chamber 78 and the outlet port 38 of the control valve 10 to the conduit 12 and therefrom to the split wheel cylinders 6, 6a of the front brakes 7, 7a to effect energization thereof in response to the fluid pressure $P_2$ substantially simultaneously with their energization in response to the fluid pressure $P_1$, as previously described.

The fluid pressure $P_1$ in the inlet chamber 76 of the control valve 10 acts on the comparator piston area $A_2$ to establish a force $P_1 A_2$, and the fluid pressure $P_2$ in the inlet chamber 78 of said control valve acts on the centering piston area $A_1$ to establish a force $P_2 A_1$ in opposition to the force $P_1 A_2$ and urging the leftward end 42 of the centering piston 41 into abutting or centering engagement with the housing shoulder 25 and the comparator piston shoulder 53. The fluid pressure $P_2$ also acts on the comparator piston area $A_3$ to establish a force $P_2 A_3$ in opposition to the force $P_1 A_2$. Since the sum of the areas $A_1$, $A_3$ is greater than the area $A_2$, as previously mentioned, the additive forces $P_2 A_1$, $P_2 A_3$ are greater than the opposing force $P_1 A_2$ to normally obviate rightward translatory movement of the comparator piston 46 from its centered or normal position. Further, since the force $P_2 A_1$ urges the centering piston 41 into engagement with the housing shoulder 25, it is apparent that the force $P_1 A_2$ is greater than the force $P_2 A_3$ to normally oppose leftward translatory movement of the comparator piston from its centered position since, as previously mentioned, the area $A_2$ is greater than the area $A_3$.

Noting that the atmospheric area $A_7$ on the proportioning piston 59 is substantially equal to the difference between the output area $A_6$ and the additive input areas $A_4$, $A_5$ and that the fluid pressures $P_1$, $P_2$, Po are substantially the same through the range ON in the graph of FIG. 4, the supplied and applied fluid pressures $P_1$, Po having the same magnitudes act on the effective atmospheric area $A_7$ to establish a rightwardly directed closing force $P_1 A_7$, and when the magnitude of the closing force $P_1 A_7$ attains a value equal to or slightly greater than the opposing spring force Fc, the closing force $P_1 A_7$ is effective to move said proportioning piston from its normal or inoperative position in a rightward direction toward an operative or isolating position to initially engage the proportioning piston valve member 63 with the seating member valve seat 73 closing the seating member aperture 72 and interrupting pressure fluid communication therethrough between the control valve inlet and outlet ports 27, 33, and in this manner, the supplied fluid pressure $P_1$ is isolated from the applied fluid pressure Po. Of course, the magnitude of the supplied fluid pressure $P_1$ at which the closing force $P_1 A_7$ is effective to move the proportioning piston 59 to its isolating position defines the "break-out" point or knee point of said proportioning piston as shown by the point N on the line OR in the graph of FIG. 4. Upon the movement of the proportioning piston 59 to its isolating position and further increases in the supplied fluid pressures $P_1$, $P_2$ in excess of the predetermined value N, the closing force $P_1 A_7$ is replaced by an output force Po $A_6$ defined by the output fluid pressure Po acting on the area $A_6$, and the input fluid pressures $P_1$, $P_2$ respectively act on areas $A_4$, $A_5$ to establish additive input forces $P_1 A_4$, $P_2 A_5$ which assist the proportioning spring force Fc and oppose the output force Po $A_6$.

It is obvious that further increases in the supplied fluid pressures $P_1$, $P_2$ in excess of the predetermined value N, as illustrated by the line NR in the graph of FIG. 4, will result in proportionally reduced or metered increases in the applied fluid pressure Po, as illustrated by the line NS in the graph of FIG. 4. For instance, when the supplied fluid pressures $P_1$, $P_2$ are further increased to a value in excess of the predetermined value N, the input forces $P_1 A_4$, $P_2 A_5$ are correspondingly increased and additive to the proportioning spring force Fc to overcome the opposing output force Po $A_6$; therefore, the proportioning piston 59 is moved leftwardly toward a metering position disengaging the proportioning piston valve member 63 from the seating member valve seat 73 and opening the seating member aperture 72 to effect a metered or modulated application therethrough of the increased supplied fluid pressure $P_1$ which establishes a proportional or ratioed increase in the applied fluid pressure Po, as shown by the line NS in the graph of FIG. 4, wherein: Po = $P_1 A_4 + P_2 A_5 +$ Fc/$A_6$.

Of course, the increased applied fluid pressure Po effects a corresponding increase in the output force Po $A_6$, and when the increased output force Po $A_6$ attains an increased magnitude substantially equal to that of the additive input and spring forces $P_1 A_4$, $P_2 A_5$ and Fc, the proportioning piston 59 is again moved rightwardly to reposition the valve member 63 thereof in lapped engagement with the seating member valve seat 73 closing the seating member aperture 72 to again isolate the supplied and applied fluid pressures $P_1$, Po. It is, of course, obvious that the proportioning piston 59 will be responsive to further increases in the supplied fluid pressures $P_1$, $P_2$ to effect further proportional increases in the applied fluid pressure Po in the same manner as previously described.

When the split system master cylinder 4 is deactuated, the supplied fluid pressures $P_1$, $P_2$ are vented to atmosphere substantially simultaneously, which eliminates the force $P_2 A_1$ acting on the centering piston 41, the forces $P_1 A_2$, $P_2 A_3$ acting on the comparator piston 46, and the forces $P_1 A_4$, $P_2 A_5$ acting on the proportioning piston 59. Upon the elimination of the supplied fluid pressures $P_1$, $P_2$, the output fluid pressure Po acting on the seating member 64 displaces the lip 75 thereof from sealing engagement with the housing counterbore 22, and in this manner, the applied fluid pressure Po returns from the outlet port 33 through the outlet chamber 77, the plurality of return flow passages 76 in said seating member, and between the displaced lip thereof and said housing counterbore to the inlet chamber and port 76, 27. When the applied fluid pressure Po is so reduced to correspondingly reduce the output force Po $A_6$ to a value less than that of the proportioning spring force Fc, the proportioning spring 71 moves the proportioning piston 59 leftwardly to its original position re-engaging the free end 66 thereof with the closure member shoulder 33a and displacing the proportioning piston valve 63 from the seating member valve seat 73 to open the seating member aperture 72 and again re-establish open pressure fluid communication therethrough between the inlet and outlet ports 27, 33 thereby effecting the complete elimination of the applied fluid pressure Po. Of course, upon the elimination of the supplied and applied fluid pressures $P_1$, $P_2$ and Po, it is obvious that the front and rear brakes 7, 7a and 8, 8a are de-energized and the respective wheel cylinders 5, 6, 5a, 6a and 8, 8a thereof deactuated, and the displaced fluid pressures in the split system 1, as described hereinbefore, returns to the split system master cylinder 4 through the branches 2, 3.

In the event of the failure of the supplied fluid pressure $P_2$ due to a malfunction of the split system master cylinder 4 or other leaks or the like in the split system 1, approximately one-half of the braking ability or energization of the front brakes 7, 7a is eliminated resulting in unbalanced vehicle braking between the axles thereof which would, of course, cause the rear axle brakes 8, 8a to lock-up or skid out prior to the front axle brakes 7, 7a upon the energization thereof when the supplied fluid pressure $P_2$ has failed; therefore, it is, of course, desirable to automatically re-balance the vehicle braking between the axles thereof under these emergency conditions effected by the failure of the supplied fluid pressure $P_2$ while also maintaining undesirable braking effectiveness and predetermined vehicle stopping distance, and this is accomplished through the present invention by not only reducing the "breakout point" or predetermined fluid pressure representing the knee point in the graph of FIG. 4 at which the proportioning valve 59 becomes generally operable but also by reducing the ratio between the supplied and applied fluid pressures $P_1$, Po, as set forth in detail hereinafter.

With respect to the knee point, as illustrated by points M and N on the line OR in the graph of FIG. 4, such knee point is determined by or is a direct function of the relationship of the proportioning spring force Fc to the atmospheric area provided on the proportioning valve 59. For instance, during the normal operation of the control valve 10, as set forth hereinbefore, with the supplied fluid pressures $P_1$, $P_2$ having substantially the same magnitude, the knee point N was determined by the supplied fluid pressure $P_1$ or applied fluid pressure Po having the same magnitude acting on the atmospheric area $A_7$ of the proportioning valve 59, to establish the rightwardly directed closing force $P_1 A_7$, and when the magnitude of said closing force attained a value substantially equal to or slightly in excess of the proportioning spring force Fc, said closing force moved said proportioning piston to its isolating position; therefore, the fluid pressure $P_1$ at which said proportioning piston is moved toward its isolating position defines the knee point N. Now considering the knee point M which is effected upon the failure of the supplied fluid pressure $P_2$, as previously mentioned, it should be noted that the area $A_5$ on the proportioning piston 59 which was hereinbefore designated as an input area during the normal operation of the control valve 10 is now converted to an atmospheric area additive to the atmospheric area $A_7$ upon the failure of the supplied fluid pressure $P_2$. In this manner, the supplied fluid pressure $P_1$ or applied fluid pressure Po having the same magnitude now acts not only on the atmospheric area $A_7$ but also on the area $A_5$ which is at atmosphere due to the failure of the supplied fluid pressure $P_2$ to establish a rightwardly directed closing force $P_1 (A_7 + A_5)$, and when the magnitude of said closing force attains a value substantially equal to or slightly greater than the opposing proportioning spring force Fc, said closing force is effective to move the proportioning piston 59 to its isolating position; therefore, the magnitude of the fluid pressure $P_1$ at which said proportioning piston is moved toward its closing position defines the knee point M. Of course, it is apparent that the knee point M is predeterminately less than the knee point N since the additive atmospheric areas $A_7$, $A_5$ are obviously predeterminately greater than only the atmospheric area $A_7$; therefore, the magnitude of the knee point M is inversely proportional or related to the size of the additive areas $A_7$, $A_5$ when the supplied fluid pressure $P_2$ has failed. With respect to the slope of the proportioning line MT in the graph of FIG. 4, such slope is directly proportional or related to the ratio between the input and output areas of the proportioning piston 59, i.e., the smaller the input area with respect to the output area the flatter the slope of the line MT; therefore, it is desirable that the input area $A_4$ of said proportioning piston be predeterminately less than the area $A_5$ thereof.

From the foregoing, it is now apparent that the proportioning piston 59 is independently operable in response to only the supplied fluid pressure $P_1$ in the split system branch 3 upon the failure of the supplied fluid pressure $P_2$ in the split system branch 2. The prevailing fluid pressure $P_1$ in the split system branch 3 acts on the effective additive atmospheric areas $A_7$, $A_5$ to establish the closing force $P_1 (A_7 + A_5)$ urging the proportioning piston 59 rightwardly against the proportioning spring force Fc to tis isolating position engaging the proportioning piston valve 63 with the seating member seat 73 and closing the seating member aperture 72 to isolate the supplied fluid pressure $P_1$ at the inlet port 27 from the applied fluid pressure Por at the outlet port 33 when the supplied and applied fluid pressures $P_1$, Por attain the predetermined value M, as shown in the graph of FIG. 4. With the proportioning piston 59 in its isolating position, increases in the supplied fluid pressure $P_1$ correspondingly increases the input force $P_1 A_4$, and when the increased input force $P_1 A_4$ and additive proportioning spring force Fc attain a magnitude great enough to overcome the opposing output force Por $A_6$, said proportioning piston is moved leftwardly toward its metering position disengaging the valve member 63 thereof from the seating member seat 73 opening the seating member aperture 72 5o effect metered or modulated pressure fluid communication therethrough between the supplied and applied fluid pressures $P_1$, Por in the inlet and outlet chambers 76, 77 which establishes a proportional or ratioed increase in the applied fluid pressure Por, as shown by the line MT in the graph of FIG. 4, wherein: Por $= P_1 A_4 + Fc/A_6$.

The increased applied fluid pressure Por effects a corresponding increase in the output force Por $A_6$, and when the increased output force Por $A_6$ attains an increased magnitude substantially equal to that of the additive input and spring forces $P_1 A_4$, Fc, the proportioning piston 59 is again moved rightwardly to its isolating position reengaging the valve 63 thereof with the seating member seat 73 to close the seating member aperture 72 and again isolate the supplied and applied fluid pressures $P_1$, Por. It is, of course, obvious that the proportioning piston 59 will be further independently operable in response to further increases in only the supplied fluid pressure $P_1$ to effect further proportional increases in the applied fluid pressure Por in the same manner as previously described. When the split system master cylinder is deactuated to vent the supplied fluid pressure $P_1$ to atmosphere, the various forces acting on the proportioning piston 59 are eliminated and the displaced fluid pressure in the split system branch 3 returns to said master cylinder substantially in the same manner as described hereinbefore.

Upon the failure of the supplied fluid pressure $P_2$, the forces $P_2 A_1$ and $P_2 A_5$ respectively acting on the centering and comparator pistons 41, 46 are eliminated, and the opposing force $P_1 A_2$ acting on said comparator piston effects the translatory movement thereof from its centered or normal position toward its rightward translated position engaging the free end 52 of the comparator piston extension 51 with the closure member shoulder 38a. The rightward translatory movement of the proportioning piston 59 drivingly engages the camming surface 48 with the operating member 49 of the electrical switch 16 to move said operating member upwardly toward a switch closing or circuit making position, and in this manner, the electrical circuit is completed or made through the lead 17 wherein the driver warning lamp 18 is energized to indicate the failure in the split brake system 1. Of course, if the supplied fluid pressure $P_1$ fails with the split system branch 2 being operative, it is apparent that the force $P_2 A_5$ acting on the comparator piston 46 will effect the leftward translatory movement thereof to its leftward translated position engaging the shoulder 56 thereof with the proportioning piston 59 in its inoperative position, and the leftward translatory movement of said comparator piston drivingly engages the camming surface 48a thereof with the swtich operating member 49 to effect the actuation of said operating member and the switch 16 and energize the electrical circuit and driver warning lamp 18, as previously described.

Referring now to FIG. 5, another horizontally split fluid pressure or brake system 100 with another control valve 101 thereon is shown having substantially the same component parts and functioning in substantially the same manner as the previously described system 1 and control valve 10 with the following exceptions.

The system 100 is provided with a conduit 102 having one end connected with the conduit 11 and the other end thereof connected with an inlet port of the control valve 101.

Figure 6:
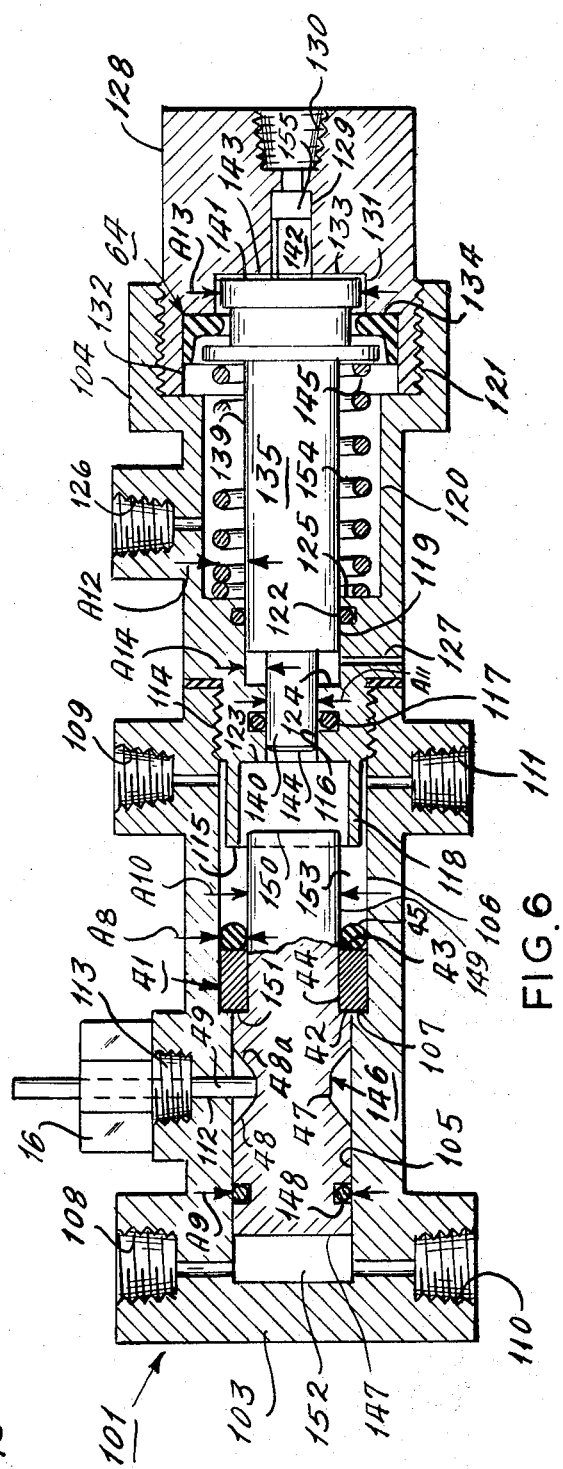
FIG. 6 is a sectional view illustrating an alternative construction of a control valve for use in the system of FIG. 5 also embodied in the present invention in cross-section.

The control valve 101, FIG. 6, is provided with leftward and rightward or warning and proportioning housing portions 103, 104, and the leftward housing 103 is provided with a blind bore 105 and counterbore 106 having an annular shoulder or abutment 107 therebetween. Inlet ports 108, 109, which receive conduits 11, 13, as previously mentioned, are provided in the housing 103 intersecting with the bore and counterbore 105, 106 adjacent to the opposed ends thereof, and outlet ports 110, 111, which receive conduits 12, 14, as previously mentioned, are also provided in said housing also intersecting said bore and counterbore adjacent to the opposed ends thereof, respectively. The outlet ports 110, 111 are shown for convenience sake, and it is well known in the art that the conduits 12, 14 could be T-connected with the conduits 11, 13 without the control valve 101, as previously mentioned. A cross-bore 112 is provided in the housing 103 having one end thereof intersecting with the bore 105 adjacent to its mid-portion while the other end thereof connects with a threaded cross-counterbore 113 in which the electrical switch 16 is threadedly received.

The housing 104 is provided with a reduced threaded extension 114 on its leftward end which is threadedly received in the rightward or open end of the counterbore 106 of the housing 103 and extends coaxially thereinto, and a free end or portion 115 is provided on said extension in the counterbore 106. A bore 116 having a sealing member or O-ring 117 disposed therein is provided in the housing 104, and said bore is axially interposed between a counterbore 118 which intersects with the housing free end 115 and stepped counterbores 119, 120 and 121, said stepped counterbore 119 having a sealing member or O-ring 122 disposed therein. Annular shoulders 123, 124, and 125 are provided on the housing 104 between the bore 116 and counterbore 118, between said bore and the stepped counterbore 119, and between the stepped counterbore 119, 120, respectively. Another inlet port 126 which receives the conduit 102, as previously mentioned, is provided in said housing intersecting with the stepped counterbore 120 adjacent to the shoulder 125, and a venting or atmospheric passage 127 is also provided in said housing intersecting with the stepped counterbore 119 adjacent to the shoulder 124. A closure member or end plug 128 is threadedly received in the stepped counterbore 121, and a bore 129 is provided in said closure member being axially interposed between an outlet port 130 which receives the conduit 15, as previously mentioned, and opposed stepped counterbores 131, 132 which are coaxial and connected with the stepped counterbore 120 in the housing 104. Annular shoulders or abutments 133, 134 are provided on the closure member 128 between the bore 129 and stepped counterbore 131 and between the stepped counterbores 131, 132, respectively.

Modulating, metering or proportioning means, such as the piston member indicated generally at 135, is provided with an enlarged intermediate or head portion 136 having annular groove means 137 therein, and the rightward annular sidewall 138 of said groove means defines a valve member. The proportioning piston 135 is also provided with opposed stepped extensions 139, 140 and 141, 142 integral with the head portion 136, and the extensions 139, 140 are slidably received in the counterbore and bore 119, 116 of the housing 104 in sealing engagement with the seals 122, 117 disposed therein while the stepped extensions 141, 142 are guidably received in the counterbore and bore 131, 129 of the closure member 128, respectively. An annular shoulder 143 is provided on the proportioning piston 135 between the stepped extensions 141, 142, and a free end portion 144 is provided on the stepped extension 140 adjacent to the shoulder 123 on the housing 104. A proportioning spring 145 is pre-compressed between the shoulder 125 of the housing 104 and the proportioning piston head portion 136 normally urging the proportioning piston 135 toward its inoperative position engaging the shoulder 143 thereof with the closure member shoulder 133.

The seating member 64, as previously described, has its aperture 72 radially spaced from the proportioning piston groove 137, and the seating member side is seated against the closure member shoulder 134 for sealing engagement with the proportioning piston valve 138 while the sealing lip of said seating member is sealably engaged with the closure member counterbore 132.

The centering piston 41, as previously described, is slidably received in the counterbore 106 of the housing 103, and the centering piston seal 45, as previously described, is sealably engaged between said counterbore and the centering piston rightward end. The centering piston leftward end 42 is normally engaged with the shoulder 107 of the housing 103, and said seal 45 and centering piston rightward end 43 defining an annular effective area $A_8$ subjected at all times to the fluid pressure at the inlet port 109.

Comparator means, such as the reciprocal switch actuating member or piston indicated generally at 146, is slidably received in the bore 105 of the housing 103 having the peripheral groove means 47 and opposed camming surfaces 48, 48a thereon immediately below the housing cross-bore 113 for driving engagement with the switch operating member 49 of the electrical switch 16, as previously described. The comparator piston 146 is provided with a leftward or free end portion 147 which is engagable with the end wall of the housing blind bore 105 to define the leftward translatory position of said comparator piston, and a peripheral seal 148 is provided on said comparator piston adjacent to said free end portion in sealing engagement with said housing blind bore. A righwardly extending reduced portion or extension means 149 is integrally provided on the proportioning piston 146, and said extension means is slidably received in the centering piston bore 44 extending through the sealing member 45 in sealing engagement therewith into the counterbore 106 of the housing 103. A righward abutment or free end 150 is provided on the extension 149, and an annular shoulder or abutment 151 is provided on the comparator piston 146 for driving or centering engagement with the centering piston leftward end 42.

An inlet chamber 152 is provided in the blind bore 105 between the end wall thereof and the proportioning piston end 147 in pressure fluid communication with the inlet port 108 at all times, and another inlet chamber 153 is provided in the counterbore 106 of the housing 103 between the seal 45 and comparator piston extension 149 and the reduced end 114 of the housing 104, said inlet chamber being in pressure fluid communication with the inlet port 109 at all times. In the housing 104, another inlet chamber 154 is provided in the counterbore 120 thereof and the counterbore 132 of the closure member 128 between the housing shoulder 124 and the sealing engagement of the proportioning piston valve 138 with the seating member seat 73, and said inlet chamber is in pressure fluid communication with the inlet port 126 at all times. An outlet chamber 155 is provided in the closure member bore and counterbore 129, 131 between the outlet port 130 and the sealing engagement of the proportioning piston valve 138 with the seating member seat 73.

It should be noted that the comparator piston 146 is provided with a cross-sectional effective area $A_9$ substantially defined by the sealing engagement of the proportioning piston seal 148 with the housing blind bore 105 and subjected to the fluid pressure in the inlet chamber at all times, and another cross-sectional effective area $A_{10}$ respectively additive and opposed to the areas $A_8$, $A_9$ is provided on the comparator piston extension 149 being substantially defined by the sealing engagement thereof with the centering piston seal 45 and subjected to the fluid pressure in the inlet chamber 153. The area $A_9$ is greater than the area $A_{10}$, and the sum of areas $A_8$, $A_{10}$ is greater than area $A_9$. A cross-sectional effective input area $A_{11}$ is provided on the proportioning piston 135 which is substantially defined by the sealing engagement of the proportioning piston stepped extension 140 with the seal 117 in the housing bore 116, said area $A_{11}$ being subjected to fluid pressure in the inlet chamber 153, and another annular cross-sectional effective input area $A_{12}$ additive to the input area $A_{11}$ is also provided on said proportioning piston being defined between the sealing engagement of the proportioning piston stepped extension 139 and housing seal 122 and the sealing engagement of the proportioning piston valve 138 with the seating member seat 73, said area $A_{12}$ being subjected to the fluid pressure in the inlet chamber 154. A cross-sectional effective output area $A_{13}$ opposed to the input areas $A_{11}$, $A_{12}$ is provided on the proportioning piston 135 defined substantially by the sealing engagement of the proportioning piston valve 138 with the seating member seat 73 and subjected to the fluid pressure in the outlet chamber 155, and to complete the description of the control valve 101, an annular cross-sectional effective atmospheric area $A_{14}$ substantially equal to the difference between the additive input areas $A_{11}$, $A_{12}$ and the output area $A_{13}$ is provided on said proportioning piston being defined substantially between the respective sealing engagements of the proportioning piston stepped extensions 139, 140 with the housing seals 122, 117 and vented to atmosphere through the vent passage 127.

Assuming the component parts of the system 100 and control valve 101 to be in their normal positions as shown in the drawings, manual operation of the master cylinder 4 creates the separate input or supplied fluid pressures $P_1$, $P_2$, and the supplied fluid pressure $P_1$ flows through the conduit 11, the inlet port and chamber 108, 152 and outlet port 110 of said control valve, and the conduit 15 to energize the front brakes 7, 7a, as previously described. The supplied fluid pressure $P_1$ also flows through the conduit 102 and the inlet port and chamber 126, 154 and outlet chamber 155 of the control valve 101 to establish an output or applied fluid pressure Po at the outlet port 130 which is transmitted through the conduit 15 to energize the rear brakes 9, 9a, as previously described. The supplied fluid pressure $P_2$ flows through the conduit 13, the inlet port and chamber 109, 153 and outlet port 111 of the control valve 101, and the conduit 14 to also energize the front brakes 7, 7a, as previously described.

Noting that the atmospheric area $A_{14}$ of the proportioning valve 135 is substantially equal to the difference between the output area $A_{13}$ and the opposed additive input areas $A_{11}$, $A_{12}$ and that the supplied and applied fluid pressures $P_1$, $P_2$, Po are substantially the same throughout the range ON in the graph of FIG. 4, the supplied or applied fluid pressures $P_1$, Po having the same magnitude act on the effective atmospheric area $A_{14}$ of said proportioning piston to establish a closing force $P_1 A_{14}$, and when the magnitude of said closing force attains a value substantially equal to or slightly greater than the compressive force Fc of the proportioning spring 145, said closing force is effective to move said proportioning piston from its normal or inoperative position leftwardly toward an operative or isolating position engaging the proportioning piston valve 138 with the seating member seat 73 to close the seating member aperture 72 interrupting pressure fluid communication therethrough between the inlet and outlet ports 126, 130, and in this manner the supplied fluid pressure $P_1$ is isolated from the applied fluid pressure Po.

The proportioning piston 135 is responsive to increases in the supplied fluid pressures $P_1$, $P_2$ in excess of the predetermined value N respectively acting on input areas $A_{12}$, $A_{11}$ to establish input forces $P_2 A_{11}$, $P_1 A_{12}$ which result in proportionally reduced or metered increases in the output fluid pressure Po, as illustrated by line NS in the graph of FIG. 4, acting on the input area $A_{13}$ to establish an output force Po $A_{13}$ opposed to said input forces, and said input and output forces replace the closing force $P_1 A_{14}$ when the supplied fluid pressures $P_1$, $P_2$ exceed the predetermined value N. For instance, when the input forces $P_1 A_{12}$, $P_2 A_{11}$ and the additive proportioning spring force Fc are correspondingly increased in response to increases in the supplied fluid pressures $P_1$, $P_2$ in excess of the predetermined value N to overcome the opposing output force Po $A_{13}$, the proportioning piston 135 is moved rightwardly toward its modulating or metering position disengaging the valve 138 thereof from the seating member seat 73 and opening the seating member aperture 72 to effect a modulated, metered or proportioned application therethrough of the supplied fluid pressure $P_1$ which establishes a proportional or ratioed increase in the applied fluid pressure Po, as shown by the line NS in the graph of FIG. 4, wherein:

$$Po = P_1 A_{12} + P_2 A_{11} + Fc/A_{13}.$$

When the increased output force Po $A_{13}$ attains a value equal to the increased input and spring forces $P_1 A_{12}$, $P_2 A_{11}$, Fc due to the aforementioned metered increase in the applied fluid pressure Po, the proportioning piston 135 is moved rightwardly to its isolating position, and said proportioning piston will, of course, be responsive to further increases in the supplied fluid pressures $P_1$, $P_2$ to effect further proportional increases in the applied fluid pressure Po in the same manner.

Of course, the supplied fluid pressures $P_1$, $P_2$ in the inlet chambers 152, 153 act on the areas $A_8$ and $A_9$, $A_{10}$ of the centering and comparator pistons 41, 146 to create opposed forces $P_1 A_9$ and $P_2 A_{10}$, $P_2 A_8$ acting thereacross, respectively. When the supplied fluid pressures $P_1$, $P_2$ are substantially equal, rightward translatory movement of the comparator piston 146 in response to the force $P_1 A_9$ is prevented by the opposing additive forces $P_2 A_8$, $P_2 A_{10}$ since the sum of the areas $A_8$, $A_{10}$ is greater than the area $A_9$, and leftward translatory movement of said comparator piston in response to the force $P_2 A_{10}$ is also prevented by the force $P_1 A_9$ since the area $A_9$ is greater than the area $A_{10}$, the force $P_2 A_8$, of course, being transferred to the housing shoulder 107. In the event of the loss of one of the supplied fluid pressures $P_1$, $P_2$, one of the forces $P_1 A_9$ and $P_2 A_{10}$ is eliminated to effect the translatory movement of the comparator piston toward one of its opposed positions engaging one of its ends 147, 150 with one of the end walls of the blind bore 105 and housing shoulder 123. Upon the translatory movement of the comparator piston 146 towards one of its translated positions, one of the camming surfaces 48, 48a is drivingly engaged with the switch operating member 49 to effect actuation thereof upwardly toward a switch closing or circuit making position wherein the electrical switch 16 is actuated to complete the electrical circuit through the lead 17 to energize the driver warning lamp 18 and indicate the failure in the split braking system 1.

As previously mentioned, the magnitude of each knee point M, N on the line OR in the graph of FIG. 4 is a direct function between the spring force Fc and the atmospheric area provided on the proportioning piston 135; therefore, the knee point N is a function of the spring force Fc and area $A_{14}$. However, in the event of the failure of the supplied fluid pressure $P_2$, the area $A_{11}$ now becomes an atmospheric area instead of an input area as designated hereinbefore, and as a result, the atmospheric area of the proportioning piston 135 is now $A_{14} + A_{11}$ instead of only $A_{14}$ which has the effect of predeterminately reducing the magnitude of the supplied fluid pressure $P_1$ at which said proportioning piston is operative to the knee point M. In this manner, the supplied r applied fluid or $P_1$, Po having the same magnitude now acts on the additive atmospheric areas $A_{14}$, $A_{11}$ due to the failure of the supplied fluid pressure $P_2$ to create a closing force $P_1 (A_{11} + A_{14})$ and ove the proportioning piston 135 from its inoperative position to its isolating position wherein said closing force is replaced by the opposing input and output forces $P_1 A_{12}$, Po $A_{13}$, and thereafter said proportioning valve is responsive to increases in the supplied fluid pressure $P_1$ in excess of the predetermined value M to effect proportional increases in the output fluid pressure Po, as previously described and as shown by the line MT in the graph of FIG. 4, wherein: $Po = P_1 A_{12} + Fc/A_{13}$.

From the foregoing, it is now apparent that novel systems 1, 100 and control valves 10, 101 meeting the objects and advantageous features set out hereinbefore, as well as others, are provided, and changes or modifications as to the precise connections, configurations, shapes and details set forth in the disclosure by way of illustration may be made by those skilled in the art without departing from the spirit of the invention.

The embodiments of the invention in which an exclusive property or privilege is claimed are defined as follows:

1. A dual fluid pressure system comprising a separate fluid pressure supply for each system, and modulating means including a pair of additive effective input areas respectively subjected to the fluid pressure of each system, said modulating means being operable generally in response to the fluid pressure in each system in excess of a predetermined value respectively acting on said effective input areas for performing a modulating operation on the fluid pressure of only one of said systems.

2. A dual fluid pressure system according to claim 1, wherein said modulating means is also operable generally in response to the fluid pressure in excess of another predetermined value in said one system acting on one of said effective input areas for performing modulating operations thereon upon the failure of the fluid pressure in the other of said systems acting on the other of said effective input areas.

3. A dual fluid pressure system according to claim 2, wherein said one effective area is less than the other thereof.

4. A dual fluid pressure system according to claim 3, comprising a third area on said modulating means subjected to atmosphere, said third area being additive to said effective input areas and substantially equal to the difference therebetween.

5. A dual fluid pressure system according to claim 2, wherein the first named predetermined value is predeterminately greater than the other predetermined value.

6. A dual fluid pressure system according to claim 2, comprising a third area on said modulating means additive to said one and other effective input areas and subjected to atmosphere at all times.

7. A dual fluid pressure system according to claim 2, comprising comparator means for comparing the magnitudes of the fluid pressure in each system and movable from a normal operating position toward one of opposed translated positions upon the failure of the fluid pressure in said other system, passage means in said comparator means and connected between said one and other systems, and at least a portion of said modulating means being movable in said passage means, said other effective area being on said modulating means portion for subjection to the fluid pressure in said other system.

8. A dual fluid pressure system according to claim 7, comprising electrical switch means operably connected with said comparator means, and a warning device connected with said switch means for energization to indicate fluid pressure failure in said one and other systems, said electrical switch means being actuated to energize said warning device in response to movement of said comparator means toward one of its one and other opposed translated positions upon the failure of fluid pressure in one of said one and other systems.

9. A dual brake system comprising a separate fluid pressure supply for each system, and a proportioning valve connected in parallel relation in said systems for performing proportioning operations on the supplied fluid pressure in one of said systems including an effective area subjected to the supplied fluid pressure in the other of said systems for assisting the proportioning operation of said proportioning valve, said proportioning valve being operable generally in response to the supplied fluid pressure in said other system acting on said effective area and in response to the supplied fluid pressure acting thereon in said one system for effecting a reduced application through said one system of the supplied fluid pressure thereof under preselected conditions and said proportioning valve also being operable generally in response only to the fluid pressure in said one system acting thereon to effect the reduced application through said one system of the supplied fluid pressure thereof under other preselected conditions upon the failure of the fluid pressure in the other of said systems acting on said effective area.

10. A dual fluid pressure system according to claim 9, comprising a pair of opposed input and output effective areas on said proportioning valve subjected to the supplied and applied fluid pressures in said one system, respectively, said first named and input effective areas being additive and the sum thereof being predeterminately less than said output effective area.

11. A dual fluid pressure system according to claim 10, comprising a fourth area on said proportioning valve vented to atmosphere and substantially equal to the difference between said output effective area and the sum of said first named and input effective areas.

12. A dual fluid pressure system according to claim 10, wherein said input effective area is predeterminately less than said first named effective area.

13. A dual fluid pressure system according to claim 9, comprising means connected with each system for comparing the magnitudes of the supplied fluid pressure in each system and movable from a normal operating position in which the magnitudes of the supplied fluid pressures acting thereon in each system are substantially equal toward one of opposed translated positions upon the failure of the fluid pressure in said other system, passage means in said first named means connected between said one and other systems, and said proportioning valve including means movable in said passage means, said effective area being on said included means and communicated with the supplied fluid pressure in said other system through said passage means.

14. A dual fluid pressure system comprising a separate fluid pressure supply for each system, at least one fluid pressure responsive motor in each system respectively connected with the supply thereof, and a proportioning valve connected in parallel relation in said systems between the respective supplies and motors thereof for performing proportioning operations on the fluid pressure in one of said systems under preselected conditions, opposed input and output effective areas on said proportioning valve in said one system, another effective area on said proportioning means additive to said input area and in the other of said systems, said proportioning valve being initially movable in response to the supplied fluid pressures acting on said input and output areas in said one system and acting on said other area in said other system of substantially the same predetermined value to a position isolating the supplied fluid pressure at said supply in said one system from that applied to said motor in said one system and said proportioning valve being thereafter further movable toward a metering position in response to increases in the supplied fluid pressure in excess of the predetermined value in said one and other systems respectively acting on said input and other areas to effect metered increases in the applied fluid pressure in said one system acting on said output area in a predetermined ratio with increases in the supplied fluid pressures in each system in excess of the predetermined value, and said proportioning means also being initially actuated toward its isolating position in response to the supplied fluid pressure in only said one system of another predetermined value acting on said input and output areas and thereafter further actuated toward its metering position to effect the metered increases in the applied fluid pressure in another predetermined ratio less than the first named predetermined ratio with the supplied fluid pressure in said one system upon the failure of the supplied fluid pressure in said other system acting on said other area.

15. A dual fluid pressure system according to claim 14, wherein said proportioning valve includes resiliently urged means, said input, output and other areas being on said resiliently urged means, and said resiliently urged means being movable against its own force toward the isolating position and being assisted by its own force upon movement to the metering position.

16. A dual fluid pressure system according to claim 15, wherein said resiliently urged means includes piston means having said input, output and other areas thereon respectively, and resilient means engaged with said piston means, the compressive force of said resilient means opposing actuation of said piston means toward the isolating position and assisting the actuation of said piston means toward the metering position.

17. A dual fluid pressure system according to claim 14, comprising a fourth area on said proportioning valve additive to said input and other areas and subjected to atmosphere at all times.

18. A dual fluid pressure system according to claim 17, wherein said fourth area is substantially equal to the difference between said output area and the sum of said input and other areas.

19. A dual fluid pressure system according to claim 14, wherein said output area is predeterminately greater than the sum of said input and other areas.

20. A dual fluid pressure system according to claim 14, wherein said input area is predeterminately less than said other area.

21. A dual fluid pressure system for a vehicle comprising a master cylinder having first and second supply fluid pressure generating chambers therein, at least one front axle brake and one rear axle brake on said vehicle, a split wheel cylinder on said front axle brake having first and second fluid pressure responsive means therein for independently and concertedly energizing said front axle brake, another wheel cyinder on said rear axle brake for effecting energization thereof, first conduit means connecting said first chamber of said master cylinder with said other wheel cylinder and said first fluid pressure responsive means of said split wheel cylinder, second conduit means connecting said second chamber of said master cylinder with said second fluid pressure responsive means of said split wheel cylinder, said master cylinder being operable generally to establish substantially equal fluid pressures in said first and second chambers thereof supplied through said first and second conduit means and applied to said other wheel cylinder and first fluid pressure responsive means energizing said rear and front axle brakes and to said second fluid pressure responsive means also energizing said front axle brake, respectively, means connected with said first and second conduit means between said master cylinder and front and rear axle brakes including a proportioning piston for controlling the application through said first conduit means to said other wheel cylinder of the supplied fluid pressure from said first chamber, first and second additive areas on said proportioning piston respectively subjected to the supplied fluid pressures in said first and second conduit means, a third area on said proportioning piston opposed to and greater than the sum of said first and second areas and subjected to the applied fluid pressure in said first conduit means, and spring means engaged with said proportioning piston, said proportioning piston being normally movable against the force of said spring means toward a position isolating the supplied and applied fluid pressures in said first conduit means when the applied fluid pressure in said first conduit means acting on said third area and the supplied fluid pressures in said first and second conduit means respectively acting on said first and second areas attain a predetermined value and said proportioning piston being thereafter farther movable assisted by the force of said spring means toward a metering position effecting metered increases in the applied fluid pressure in said first conduit means in a predetermined ratio with the increases in the supplied fluid pressures in said first and second conduit means in excess of the predetermined value, and said proportioning piston also being movable against the force of said spring means toward its isolating position when the supplied and applied fluid pressures in said first conduit means respectively acting on said first and third areas attain another predetermined value less than the first named predetermined value and said proportioning piston being thereafter further movable assisted by the force of said spring means toward its metering position to effect the metered increases in the applied fluid pressure on said first conduit means in another predetermined ratio less than the first named predetermined ratio with the increases in the supplied fluid pressure in said first conduit means in excess of the other predetermined value upon the failure of the supplied fluid pressure in said second conduit means acting on said second area of said proportioning piston.

22. A control valve comprising a housing, modulating means movable in said housing for performing modulating operations on one of separate fluid pressures supplied thereto including a pair of additive effective input areas respectively subjected to the separate supplied fluid pressures, said modulating means normally being generally operable in response to the separate fluid pressures respectively acting on said input areas to effect a reduced application through said housing of the one separate supplied fluid pressure under preselected conditions and said modulating means also being generally operable in response only to the one separate supplied fluid pressure acting on one of said input areas to effect the reduced application thereof through said housing under other preselected conditions upon the failure of the other of the separate supplied fluid pressures acting on the other of said input areas.

23. A control valve comprising a housing, a proportioning valve movable in said housing for performing proportioning operations on one of separate fluid pressures supplied thereto under preselected conditions and including an effective area subjected to the other of the separate supplied fluid pressures for assisting the proportioning operation of said proportioning valve, said proportioning valve being normally generally operable in response to the other separate supplied fluid pressure acting on said area and in response to the one separate supplied fluid pressure acting on said proportioning valve in excess of substantially the same predetermined value to establish a reduced fluid pressure applied through said housing in a predetermined ratio with said one separate supplied fluid pressure, and said proportioning valve also being generally operable in response to only the one separate supplied fluid pressure acting thereon in excess of another predetermined value predeterminately less than the first named predetermined value to establish the reduced applied fluid pressure in another predetermined ratio predeterminately less than the first named predetermined ratio with the one separate supplied fluid pressure in the event of the failure of the other separate supplied fluid pressures acting on said area.

24. A control valve according to claim 23, comprising opposed input and output areas on said proportioning valve respectively subjected to the one separate supplied fluid pressure and the reduced applied fluid pressure, said input and first named areas being additive.

25. A control valve according to claim 24, wherein the sum of said additive input and first named areas is predeterminately less than said output area.

26. A control valve according to claim 25, comprising an atmospheric area on said proportioning valve additive to said input and first named areas and substantially equal to the difference therebetween, and means in said housing for subjecting said atmospheric area to the atmosphere at all times.

27. A control valve according to claim 23, wherein said proportioning valve includes resiliently urged means, said resiliently urged means being normally initially movable against its own force in response to the one and other separate supplied fluid pressures of substantially the same first named predetermined value respectively acting thereon and on said area toward a position in said housing isolating the applied fluid pressure and the one separate supplied fluid pressure and said resiliently urged means being thereafter further movable in response to the one and other separate supplied fluid pressures in excess of the predetermined value respectively acting thereon and on said area and assisted by its own force toward a metering position in said housing to establish the reduced applied fluid pressure in the first named predetermined ratio, and in the event of the failure of the other separate supplied fluid pressure acting on said area said resiliently urged means also being successively movable toward its isolating and metering positions in response only to the one separate supplied fluid pressure of the other predetermined value and increases therein in excess of the other predetermined value against and assisted by its own force, respectively, to establish the reduced applied fluid pressure in the other predetermined ratio.

28. A control valve according to claim 27, wherein said resiliently urged means includes piston means movable in said housing, opposed input and output areas on said piston means and respectively subjected to the one separate supplied fluid and the reduced applied fluid pressure, said first named area being on said piston means and additive to said input area, and spring means engaged with said piston means urging it toward an inoperative position in said housing, said piston means being movable from its inoperative position against said spring means in response to the one and other separate supplied fluid pressures respectively acting on said input and output areas and on said first named area toward the isolating position when the one and other separate supplied fluid pressures and the applied fluid pressure attain substantially the same first named predetermined value and said piston means being further movable from the isolating position against the applied fluid pressure acting on said output area in response to said spring means and the one and other separate supplied fluid pressures in excess of the first named predetermined value acting on said input and first named areas toward the metering position to effect the increases in the applied fluid pressure in the first named predetermined ratio, and in the event of the failure of the other separate supplied fluid pressure acting on said other area said piston means also being movable toward its isolating position against said spring means in response to the one separate supplied fluid pressure and the applied fluid pressure acting on said input and output areas when said one separate supplied fluid pressure and applied fluid pressure attain the other predetermined value and said piston means being thereafter further movable toward its metering position in response to increases in the one separate supplied fluid pressure in excess of the other predetermined value acting on said input area assisted by said spring means to establish the reduced applied fluid pressure acting on said third area in the other predetermined ratio.

29. A control valve according to claim 28, comprising other piston means movable in said housing between a normal operating position and opposed translated positions including opposed end portions respectively subjected to the one and other separate supplied fluid pressures, said other piston means being movable from its normal operating position toward one of its opposed translated position in response to the one separate supplied fluid pressure acting on one of said opposed end portions upon the failure of the other separate supplied fluid pressure acting on the other of said opposed end portions, passage means in said other piston means intersecting with said opposed end portions, extension means movable in said passage means and having a free end portion defining said first named area, said extension means defining with said other piston means a shoulder thereon within said passage means, a fourth area on said shoulder additive to said first named and input areas, and other passage means in said other piston means and connecting with said first named passage means for connecting said fourth area with atmosphere at all times.

30. A control valve comprising a housing having a pair of inlet ports and an outlet port therein, proportioning means movable in said housing for controlling pressure fluid communication between one of said inlet ports and said outlet port including an effective area subjected to the fluid pressure at the other of said inlet ports, said proportioning means being movable in response to the fluid pressure at said one inlet port acting thereon and in response to the fluid pressure at said other inlet port acting on said area in excess of substantially the same predetermined value toward a position in said housing establishing metered pressure fluid communication between said one inlet port and said outlet port wherein the fluid pressure at said outlet port is in a predetermined ratio with that at said inlet ports, and in the event of the loss of the fluid pressure at said other inlet port acting on said effective area said proportioning means is also movable in response to only the fluid pressure at said one inlet port acting thereon in excess of another predetermined value predeterminately less than the first named predetermined value toward its position establishing metered pressure fluid communication between said one inlet port and said outlet port wherein the fluid pressure at said outlet port is in another predetermined ratio predeterminately less than said first named predetermined ratio with only the fluid pressure at said one inlet port.

31. A control valve according to claim 30, comprising an input area on said proportioning means subjected to the fluid pressure at said one inlet port and additive to said first named area, and an output area on said proportioning means opposed to said first named and input areas and subjected to the fluid pressure at said outlet port, said output area being greater than the sum of said first named and input areas.

32. A control valve according to claim 30, wherein said proportioning means is normally initially movable in response to the fluid pressures at said one and other inlet ports of substantially the same first named predetermined value respectively acting thereon and on said area toward a position in said housing interrupting pressure fluid communication between said one inlet port and said outlet port and said proportioning means being thereafter further movable toward its metered pressure fluid communication position to establish the fluid pressure at said outlet port in the first named predetermined ratio, and upon the failure of the fluid pressure at said other inlet port acting on said effective area said proportioning means is intially movable in response to only the fluid pressures at said one inlet port and said outlet port of the other predetermined value acting thereon toward its pressure fluid communication interrupting position and being thereafter further movable toward its metered pressure fluid communication position in response to increases in the fluid pressure at said one inlet port in excess of the other predetermined value to establish the fluid pressure at said outlet port in the other predetermined ratio.

33. A control valve according to claim 32, comprising a valve seat in said housing between said one inlet port and said outlet port for engagement with said proportioning means, said proportioning means being movable into engagement with said valve means in its pressure fluid communication interrupting position and being thereafter disengaged from said valve means upon the movement of said proportioning means toward its metered pressure fluid communication position.

34. A control valve according to claim 33, comprising valve means on said proportioning means for engagement with said valve seat, said valve means being movable with said proportioning means into engagement with said valve seat upon the movement of said proportioning means toward its pressure fluid communication interrupting position and said valve means being disengaged from said valve seat upon the movement of said proportioning means toward its metered pressure fluid communication position.

35. A control valve according to claim 32, wherein said proportioning means includes resiliently urged means, said resiliently urged means being movable against its own force toward its pressure fluid communication interrupting position and said resiliently urged means being assisted by its own force upon the movement thereof toward its metered pressure fluid communication position.

36. A control valve according to claim 35, comprising a valve seat in said housing between said one inlet port and said outlet port, said resiliently urged means including piston means movable in said housing between said one inlet port and outlet port, valve means on said piston means for engagement with said valve seat, extension means on said piston means, said effective area being in said extension means, opposed input and output areas on said piston means subjected to the fluid pressures at said one inlet port and said outlet port, respectively, said output area being opposed to said first named and input areas and predeterminately greater than the sum thereof, a fourth area on said piston means vented to atmosphere and substantially equal to the difference between the sum of said first named and input areas and said output area, and spring means engaged between said housing and piston means normally urging said piston means toward an inoperative position engaged with said housing and disengaging said valve means from said valve seat, said piston means being normally initially movable from its inoperative position against the force of said spring means in response to fluid pressure at said one and other inlet ports and outlet port of substantially the same first named predetermined value respectively acting on said input, first named and output areas toward its pressure fluid communication interrupting position to engage said valve means with said valve seat and said piston means being thereafter further movable in response to the force of said spring means and increases in the fluid pressures at said one and other inlet ports in excess of the first named predetermined value respectively acting on said input and first named areas toward its metered pressure fluid communication position disengaging said valve means from said valve seat to establish the increases in the fluid pressure at said outlet port acting on said output area in the first named predetermined ratio with the increased fluid pressures at said one and other inlet ports, and in the event of the failure of the fluid pressure at said other inlet port acting on said first named area said piston means is also movable against the force of said spring means in response to the fluid pressure only at said one inlet port and said outlet port substantially of the other predetermined value respectively acting on said input and output areas toward its pressure fluid communication interrupting position engaging said valve means with said valve seat and said piston means being thereafter further movable in response to increases in only the fluid pressure at said one inlet port in excess of the other predetermined value acting on said input area and assisted by the force of said spring means toward its metered pressure fluid communication position disengaging said valve means from said valve seat to establish the increases in the fluid pressure at said outlet port acting on said output area in the other predetermined ratio with the increased fluid pressure at said one inlet port.

37. A control valve according to claim 36, comprising other piston means movable in said housing between said inlet ports from a normal operating position toward opposed translated positions, a pair of opposed end portions on said other piston means respectively subjected to the fluid pressures at said inlet ports, means on said other piston means defining with said housing an atmosphere chamber between said opposed end portions, a pair of stepped bores in said other piston means connected between said opposed end portions, said other piston means and extension means being movable in the larger and smaller of said stepped bores, respectively, a free end portion on said extension means in said smaller stepped bore and defining said first named area, said extension means defining with said other piston means a shoulder thereon in said larger stepped bore, a fourth area defined on said shoulder and additive to said first named and input areas, passage means in said other piston means connected between said larger stepped bore and atmospheric chamber subjecting said fourth area to atmosphere at all times, said other piston means being movable from its normal operating position toward one of its opposed translated positions in response to the fluid pressure at said one inlet port acting on one of said opposed end portions upon the failure of the fluid pressure at said other inlet port acting on the other of said opposed end portions, an electrical switch in said housing including an operating member movable between switch energizing and de-energizing positions and extending into said atmospheric chamber for driving engagement with said other piston means, said operating member being driven to its switch energizing position upon the movement of said other piston means from its normal operating position toward its one or the other of its translated positions.

38. A control valve comprising a housing having a pair of fluid pressure chambers therein, modulating means movable in said housing for performing a modulating operation on fluid pressure between said chambers under preselected conditions, said modulating means being generally operable to effect modulated applications of fluid pressure from one of said chambers to the other of said chambers in a predetermined ratio when the fluid pressure in said one chamber exceeds a predetermined value, and extension means on said modulating means defining with said housing a third chamber separate from one and other chambers for subjection to fluid pressure of substantially the same magnitude as that in said one chamber, an effective area on said extension means subjected to the fluid pressure in said third chamber for assisting the modulating operation of said modulating means, said modulating means also being generally operable to effect modulated applications of fluid pressure from said one chamber to said other chamber in another predetermined ratio predeterminately greater than the first named predetermined ratio when the fluid pressure in said one chamber exceeds another predetermined value predeterminately greater than said first named predetermined value in the event of the failure of the fluid pressure in said third chamber acting on said effective area.

* * * * *

UNITED STATES PATENT OFFICE
CERTIFICATE OF CORRECTION

Patent No. 3,773,363            Dated November 20, 1973

Inventor(s) Joseph E. Papin

It is certified that error appears in the above-identified patent and that said Letters Patent are hereby corrected as shown below:

Column 9, line 61, "tis" should read -- its --.
Column 15, line 49, delete "r" and insert -- or --; same line, after "fluid" delete "or" and insert -- pressure --; line 52, "ove" should read -- move --.

Signed and sealed this 17th day of September 1974.

(SEAL)
Attest:

McCOY M. GIBSON, JR.
Attesting Officer

C. MARSHALL DANN
Commissioner of Patents